FIG. I

INVENTOR.
THOMAS L. FAWICK
BY Willard D. Eakin
ATTORNEY

Dec. 13, 1955  T. L. FAWICK  2,726,738
HYDRAULIC, PNEUMATIC AND VACUUM OPERATED BRAKES
Filed Feb. 7, 1951  3 Sheets-Sheet 2

INVENTOR.
THOMAS L. FAWICK
BY Willard D. Eakin
ATTORNEY

Dec. 13, 1955  T. L. FAWICK  2,726,738
HYDRAULIC, PNEUMATIC AND VACUUM OPERATED BRAKES
Filed Feb. 7, 1951  3 Sheets-Sheet 3
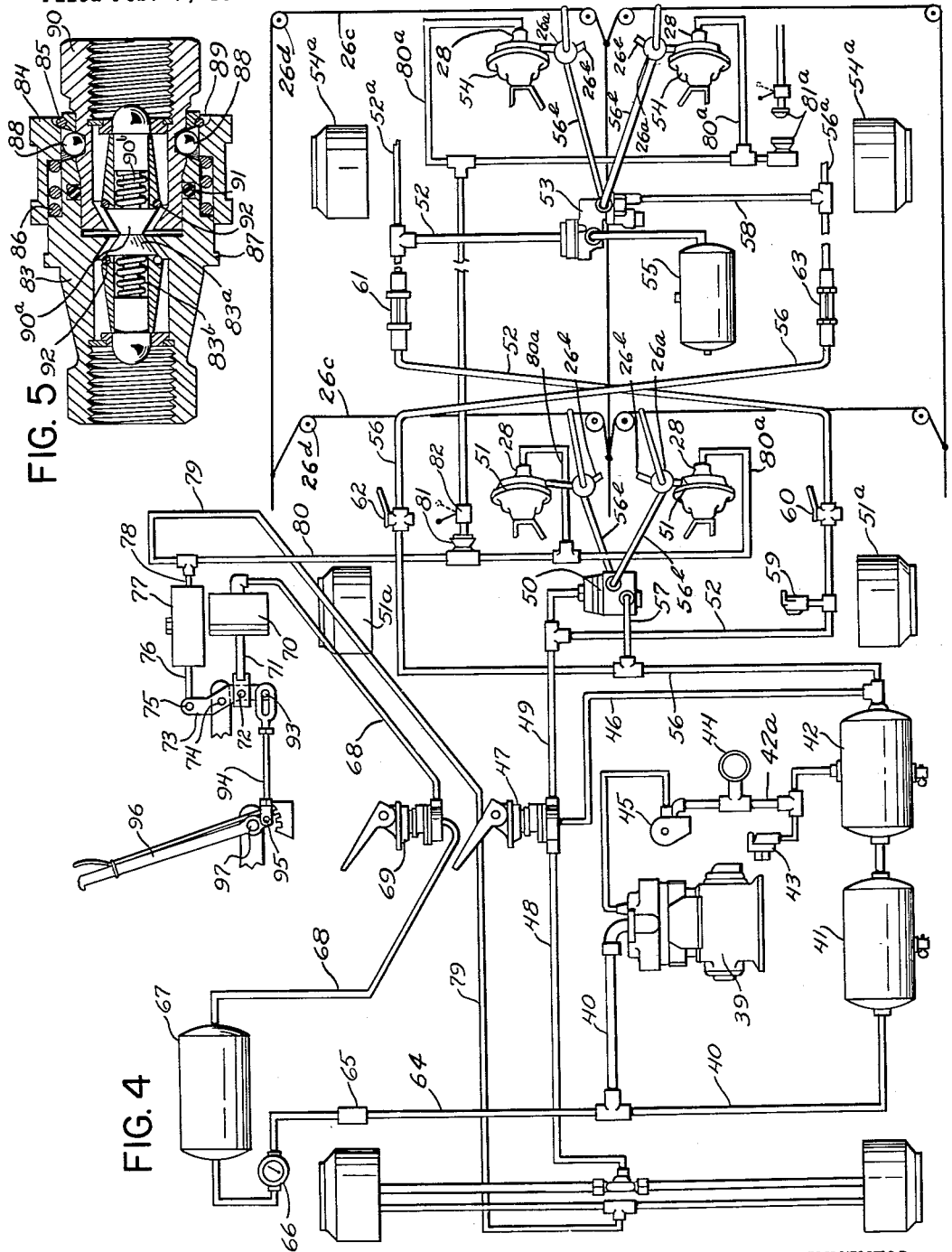
INVENTOR.
THOMAS L. FAWICK
BY Willard D. Eakin
ATTORNEY United States Patent Office 2,726,738
Patented Dec. 13, 1955

2,726,738

HYDRAULIC, PNEUMATIC AND VACUUM OPERATED BRAKES

Thomas L. Fawick, Cleveland, Ohio

Application February 7, 1951, Serial No. 209,788

6 Claims. (Cl. 188—152)

This invention relates to braking apparatus for vehicles.

Its chief objects are to provide dependable and highly effective means for emergency braking in case of failure of the conventional air brakes; to provide such means especially adapted for the emergency braking of one or more trailers hitched to a power vehicle; to provide such means having a plurality of independent sources of braking power; to provide emergency braking means adapted to be employed either alone or in assistance of the conventional service brakes; to provide emergency braking means adapted to be used for holding the vehicle or vehicles when it or they are parked; to provide a braking system adapted for the uncoupling and recoupling of hydraulic pressure lines connecting the vehicles without the necessity of getting air out of the hydraulic system after the recoupling; to provide simplicity, economy and durability; and to provide some or all of these advantages in apparatus adapted to be simply and economically incorporated in air-brake systems that are now extensively in use.

Of the accompanying drawings:

Fig. 4 is a diagrammatic representation of the system.

Fig. 5 is a longitudinal middle section of a valved coupling adapted to prevent admission of air to the hydraulic lines when they are uncoupled.

Figure 1:
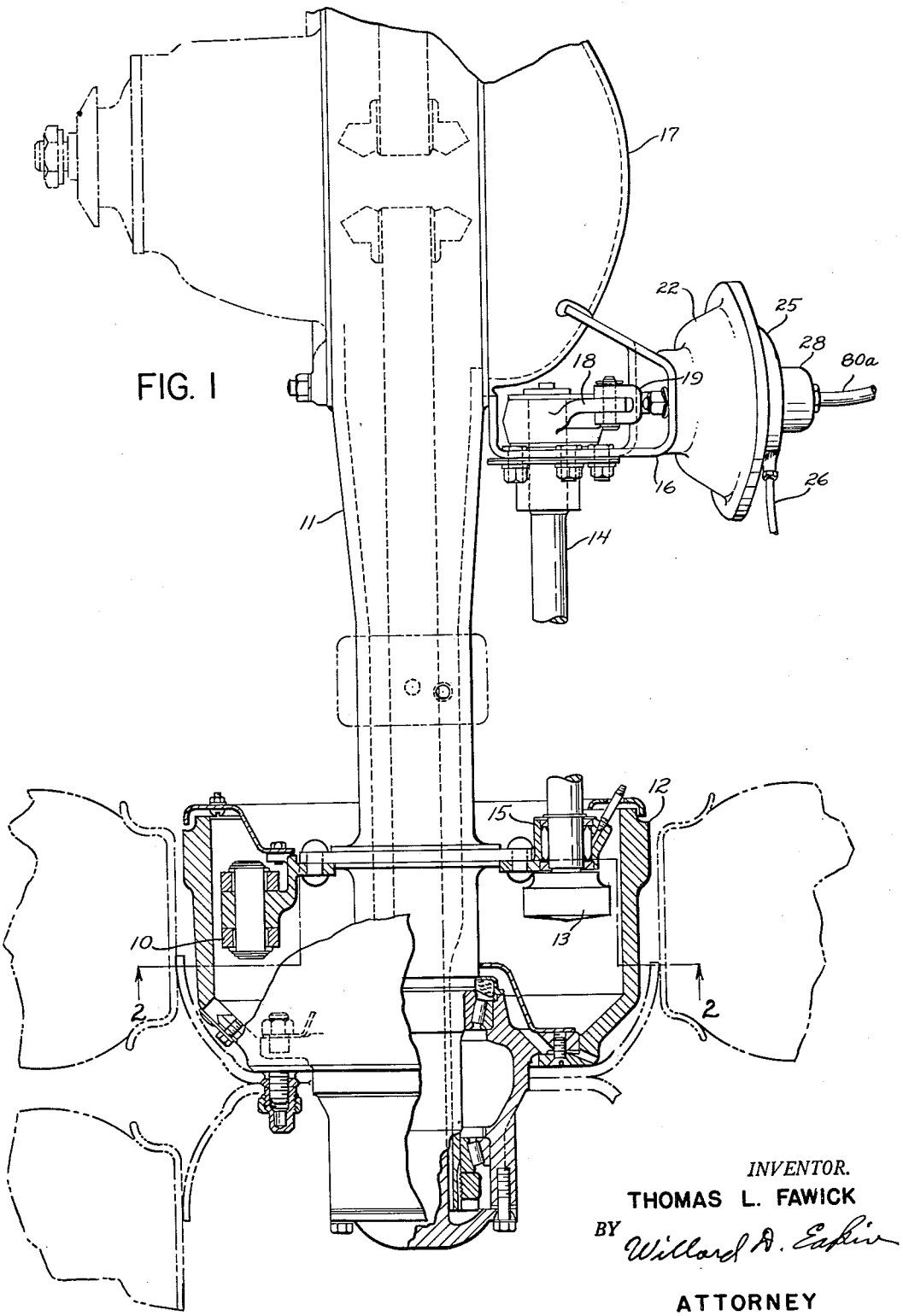
Fig. 1 is a view from above, with parts sectioned and broken away, of a portion of a drive-axle assembly of a conventional type in general, but modified slightly for incorporation of a part of the system embodying my invention.
Figure 2:
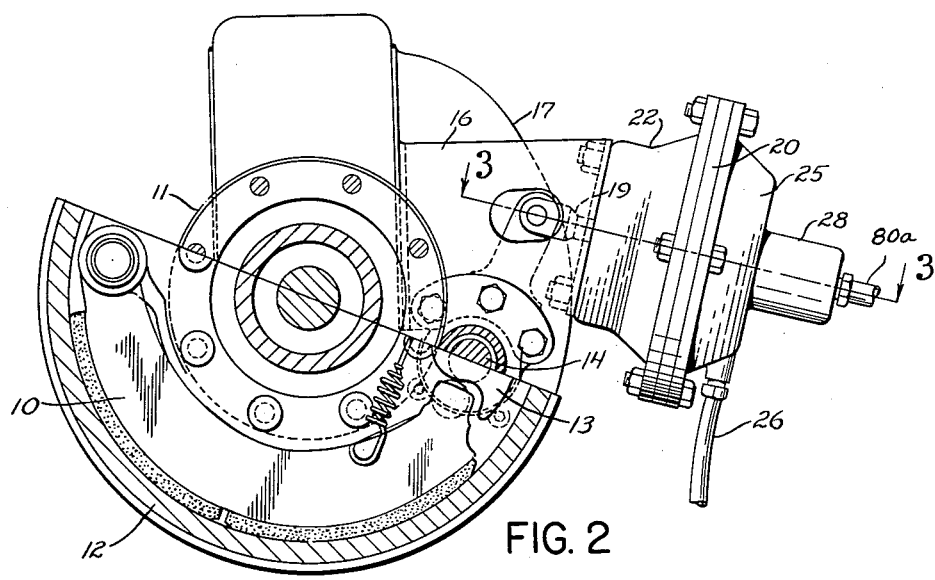
Fig. 2 is an end view of the same, from the left of Fig. 1, but with parts broken away and sectioned on line 2—2 of Fig. 1.

The drawings show the invention as applied to an otherwise conventional braking system comprising the usual pair of brake shoes 10, 10, Figs. 1 and 2, hinged upon the axle housing 11 and adapted to be urged in opposite directions against the brake-drum 12 by the usual cam head 13, the cam head being secured upon a rock-shaft 14 journaled in brackets 15, 16 mounted upon the axle housing.

Figure 3:
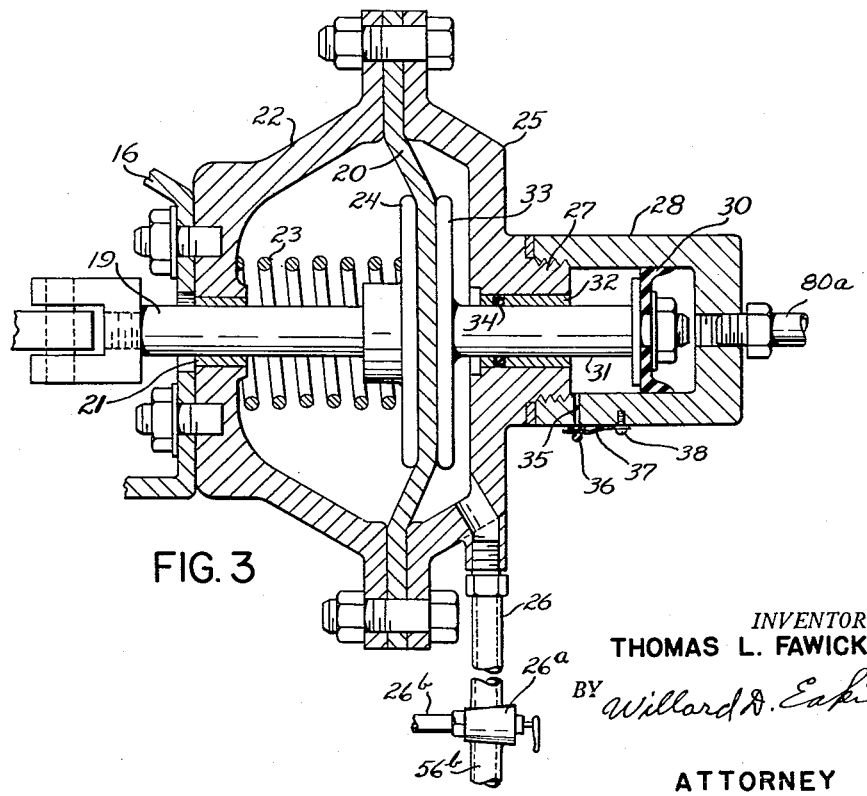
Fig. 3 is a section on line 3—3 of Fig. 2.

The rock-shaft 14 has secured upon its inner end, near the differential-gear housing 17, a rocker-arm 18 hinged to the stem 19 of a diaphragm 20, Fig. 3.

The stem 19 extends through a slide bearing 21 in the wall of the base section 22, of usual form, of the pneumatic "brake chamber," and the usual spring 23, for effecting return movement of the diaphragm, is mounted between the inner face of the brake-chamber section 22 and a flat head 24 mounted on the stem 19 for receiving the pressure of the diaphragm.

For the usual cover section of the brake chamber, I substitute a cover section 25, formed at one side with the usual threaded inlet socket for the coupling of an air hose or pipe 26 adapted to be connected alternatively, through a three-way valve 26ª, with an air line 56ᵇ, or a suction line 26ᵇ; and formed also with a central threaded nipple 27, Fig. 3, to have screwed thereon the open end of a cup-like pressure fluid cylinder 28, having a threaded inlet socket for a hydraulic hose or pipe which is a part of a pressure line 80ª (see Fig. 4).

In case the cams 13 fail to be moved in relation to their cam-followers by the force of the spring 23, and consequently leave the brakes locked, as sometimes occurs with dire results, the spring 23 can be assisted in unlocking the brakes, when the head 24 is secured to the diaphragm, as by vulcanization, by applying suction to the right-hand side of the diaphragm by means of the three-way valve 26ª. The pipe 26ᵇ can lead from any suitable source of suction, such as the intake manifold of the motor. The valve 26ª is shown only diagrammatically in Fig. 3. At least its control member would of course be positioned within easy reach of the driver. In Fig. 4 the control means for the four valves 26ª there shown is diagrammatically represented by pull lines such as the lines 26ᶜ, 26ᵉ, running over pulleys, such as the pulleys 26ᵈ, 26ᵈ, mounted in fixed positions, by means not shown, upon the tractor and the trailer.

Mounted in the cylinder 28 is a piston 30 of which the stem 31 extends through a slide bearing 32 in the cover section 25 and has a flat head 33 on its inner end for pushing against the diaphragm 20, for applying the brakes in case of failure of the air pressure, or, alternatively, for assisting the air pressure for high braking force, or for setting the brakes for parking of the vehicle.

Preferably the bearing 32 is sealed to the stem 31 by a circular-section rubber sealing ring 34 seated in an annular groove in the inner face of the bearing, to avoid leakage, through the bearing, of the service air delivered through the pipe 26, and, to permit the piston 30 to have its brake-applying movement without developing pressure ahead of it, the cylinder 28 is formed with a vent hole 35.

To prevent entrance of dirt or moisture through the vent hole it is preferably provided with a covering shield 36 mounted on a spring 37 secured to the outer face of the cylinder as by a screw 38. Although fitting well enough to prevent foreign matter from getting into the cylinder the shield 36 preferably does not tightly seal against the cylinder, so that the spring 23 can move the piston 30 to the right without developing excessive suction in the left end of the cylinder.

Preferably the head 33 is not attached to the diaphragm, so that the piston 30 has lost-motion relationship to the members 24 and 19 and can remain in its right-hand positions during the normal operation of the brakes by air only.

The control system, Figs. 4 and 5, comprises the usual motor-driven air-compressor 39 providing compressed air, through a line 40, to the usual service tanks 41, 42, and provided with a return line 42ª, having in it the usual low-pressure indicator 43, air-gauge 44 and governor 45.

From these tanks 41, 42, the usual line 46 leads to the foot-control service valve 47 and from it a service line 48 leads to the front-wheel brakes and a service line 49 leads to the usual relay valve 50 on the tractor which controls the brake chambers 51, 51 for the rear wheels of the tractor, the brake drums of which are represented at 51ª, 51ª.

The service line 49, through a branch 52, leads also to the usual emergency relay valve 53 on the trailer, which controls the trailer's brake chambers 54, 54, whose brake-drums are represented at 54ª, 54ª. This valve 53 is associated, as is usual, with an air tank 55 mounted on the trailer and kept constantly charged with air by a line 56 which leads from the tanks 41, 42 and has respective branches 57 and 58 leading respectively to the relay valve 50 on the tractor and the emergency relay valve 53 on the trailer.

The line 52 is provided with the usual stop-light switch 59, shut-off valve 60 and coupling 61 for permitting disconnecting of the trailer, and the line 56 has a corresponding shut-off valve 62 and coupling 63. For permissible connection of the lines 52 and 56 with braking apparatus on a second trailer they are shown with rearward extensions broken away at 52ᵃ and 56ᵃ.

The parts of the system thus far described with reference to Fig. 4 is conventional and is well understood by those skilled in the art.

My present invention, in addition to and in conjunction with the features of novelty shown in Fig. 3, consists in the provision of means shown in Figs. 4 and 5 for supplementing and for substituting for the conventional air-brake system above described.

From the compressor's output line 40 an air line 64 leads, through a check-valve 65 and an air gauge 66, to a reserve-and-emergency air-pressure tank 67, preferably but not necessarily mounted on the tractor. This tank is kept constantly charged by the compressor and as the check valve 65 prevents a return flow of air in case of failure of the compressor or any of the conventional air lines the driver has always at his command a reserve or emergency supply of compressed air wholly independent of any such failure.

From the tank 67 a line 68 leads, through a second foot-controlled valve 69, to the right-hand end of a relatively large-diameter cylinder 70 the piston-rod 71 of which is hinged at 72 to the lower arm of a two-armed lever 73 fulcrumed on the tractor at 74. The upper arm of the lever 73 is hinged at 75 to the outer end of the piston-rod 76 of a hydraulic (oil) cylinder 77 of a diameter smaller than that of the air cylinder 70, for high hydraulic pressure. A suitable supply of oil or brake-fluid is contained in the hydraulic system, which comprises the cylinder 77 and a line 78 having a branch 79 leading to front-wheel braking means of any suitable design, and a branch 80 leading, through sub-branches 80ᵃ, 80ᵃ to respective hydraulic cylinders, such as the cylinder 28 above described, for the rear wheels of the tractor; and, through a two-way shut-off coupling 81 (Figs. 4 and 5), a hand-lever shut-off valve 82, and sub-branches 80ᵃ, 80ᵃ, to the respective hydraulic cylinders 28, 28 for the trailer brakes. The oil-cylinder 77, preferably is provided with the usual oil-replenishing means, as in the case of the master cylinder of standard hydraulic brakes.

For permissible connection of the line 80, 80ᵃ with braking apparatus on a second trailer it is shown as being provided with a second two-way shut-off coupling 81ᵃ.

These shut-off couplings are old in other associations. Each comprises a casing 83, Fig. 5, having a sleeve 84 slidably mounted upon it, retained thereon by a snap-ring 85, and urged to the right by a spring 86. Sliding of the sleeve 84 to the left, into abutment with a stop-flange 87 on the casing, permits locking balls 88, 88 to be forced outward into an annular corner recess 89 in the casing while still retained by the snap-ring 85, the balls thus moving out of an annular groove in a nipple member 90 and permitting the latter to be moved into or out of the casing. The inner face of the casing is formed with an annular groove occupied by a circular-section rubber sealing ring 91 for sealing it to the nipple. The casing 83 and the nipple 90 are internally formed with respective valve seats for respective conical valves 83ᵃ, 90ᵃ which are backed by respective springs 83ᵇ, 90ᵇ adapted to permit the conical valves to be opened by abutment of their smaller ends with each other when the nipple 90 is shoved into the casing but to force the respective valves shut when the nipple is removed. Each of the conical valves preferably is provided with a circular-section rubber sealing ring 92 in a groove at the larger end of its conical portion.

This type of shut-off valve permits the line to be uncoupled and recoupled without substantial escape of braking fluid or admission of air to the oil lines and consequently makes it unnecessary to bleed air out of the hydraulic system after the recoupling.

For assisting the cylinder 70, or to substitute for it in case of failure of the emergency system comprising the line 68, the lower arm of the lever 73 extends downward beyond its hinged connection at 72 to the piston-rod 71, and at its lower end the lever arm has lost-motion pin-and-slot connection at 93 to a pull rod 94 hinged at 95 to the lower end of a hand lever 96 fulcrumed on the tractor at 97 and provided with a conventional ratchet and keeper. The lost-motion connection at 93 permits normal functioning of the cylinder 70 while the lever 96 is set in a fixed position but also provides for manual development of pressure in the oil cylinder 77 on occasion.

The mode of operation will be manifest from the foregoing description.

Various modifications are possible without sacrifice of all of the advantages set out in the foregoing statement of objects and without departure from the scope of the invention as defined in the appended claims.

I claim:

1. A braking system for a vehicle having an axle structure and a wheel-brake associated therewith, said system comprising two fluid-impelled members, operable each independently of the other's operation, for actuating said brake, fluid-confining means mounted directly upon said axle structure, for containing and effecting actuation of said members, and respective means each operable independently of the other's operation for supplying super-atmospheric pressure fluid to said members alternatively, one of said fluid-supply means comprising a motor-driven fluid-impelling member and another comprising a manually-driven fluid-impelling member.

2. A system as defined in claim 1 which comprises alternative means for supplying fluid to one of the recited two fluid-impelled members, one of the said alternative means comprising an emergency tank and a fluid-impelling member actuated by fluid therefrom and the other of said alternative means comprising a manually-actuated fluid-impelling member.

3. A system as defined in claim 2 comprising a lever through which the first-recited, fluid-impelling member acts to impel the fluid and lost-motion means, associated with said lever, through which the last recited fluid-impelling member acts to impel the fluid.

4. A braking system for a vehicle having an axle structure and a wheel brake associated therewith, said system comprising a diaphragm chamber mounted directly upon said axle structure, a diaphragm mounted as a wall of said diaphragm chamber, a brake-engaging member mounted in position to be driven by said diaphragm for effecting engagement of said brake, a return-spring for moving said member in the opposite direction, a pressure-fluid cylinder mounted upon said diaphragm chamber, and a piston assembly mounted in said cylinder and comprising a part slidably extending through a wall of said diaphragm chamber in sealed relation thereto and having engagement with said diaphragm for impelling said diaphragm against the force of said return-spring to cause said diaphragm to drive said brake-engaging member.

5. A braking system as defined in claim 4 in which the recited cylinder is formed with a vent to the atmosphere on the low-pressure side of the piston element.

6. A braking system as defined in claim 4 in which the part of the piston structure recited as having engagement with the diaphragm is freely separable from the diaphragm by actuating-fluid in the diaphragm chamber urging the diaphragm and said part in opposite directions.

References Cited in the file of this patent

UNITED STATES PATENTS 231,258     Batchelor _____ Aug. 17, 1880

(Other references on following page)

UNITED STATES PATENTS

| | | | |
|---|---|---|---|
| 1,819,971 | Pieper | Aug. 18, | 1931 |
| 2,057,707 | Carroll | Oct. 20, | 1936 |
| 2,065,017 | Oliver | Dec. 22, | 1936 |
| 2,108,714 | Hirsch et al. | Feb. 15, | 1938 |
| 2,248,435 | Pleines | July 8, | 1941 |
| 2,275,697 | Stelzer | Mar. 10, | 1942 |
| 2,336,342 | Brewer | Dec. 7, | 1943 |
| 2,416,222 | Rodway | Feb. 18, | 1947 |
| 2,497,438 | Butler | Feb. 14, | 1950 |
| 2,569,610 | Ingres | Oct. 2, | 1951 |

FOREIGN PATENTS

| | | | |
|---|---|---|---|
| 279,905 | Great Britain | Mar. 15, | 1928 |